(12) United States Patent
Harms

(10) Patent No.: US 11,772,899 B2
(45) Date of Patent: Oct. 3, 2023

(54) CARGO VELOCITY CONTROL FOR CARGO HANDLING SYSTEMS

(71) Applicant: Goodrich Corporation, Charlotte, NC (US)

(72) Inventor: Scott P. Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 184 days.

(21) Appl. No.: 17/494,667

(22) Filed: Oct. 5, 2021

(65) Prior Publication Data

US 2023/0103654 A1    Apr. 6, 2023

(51) Int. Cl.
*B65G 43/00*  (2006.01)
*B64D 9/00*  (2006.01)
*B65G 13/06*  (2006.01)
*B65G 67/00*  (2006.01)

(52) U.S. Cl.
CPC .............. *B65G 43/00* (2013.01); *B64D 9/00* (2013.01); *B65G 13/06* (2013.01); *B65G 67/00* (2013.01); *B64D 2009/006* (2013.01); *B65G 2203/0291* (2013.01); *B65G 2814/0398* (2013.01)

(58) Field of Classification Search
CPC .................... B65G 43/00; B65G 13/06; B65G 2203/0291; B65G 2814/0398; B65G 67/00; B64D 9/00; B64D 2009/006
See application file for complete search history.

(56) References Cited

U.S. PATENT DOCUMENTS

| 4,799,161 | A  | * | 1/1989 | Hirotsu | ................... | B61C 15/10 |
| | | | | | | 318/52 |
| 6,328,154 | B1 | | 12/2001 | Huber | | |
| 9,845,196 | B2 | | 12/2017 | Larson | | |
| 9,889,990 | B2 | | 2/2018 | Dimitrov et al. | | |
| 2022/0411061 | A1 | * | 12/2022 | Harms | ................... | G01P 13/00 |
| 2023/0068486 | A1 | * | 3/2023 | Scherenberger | ......... | B64D 9/00 |

* cited by examiner

*Primary Examiner* — Gene O Crawford
*Assistant Examiner* — Lester Rushin, III
(74) *Attorney, Agent, or Firm* — SNELL & WILMER L.L.P.

(57) ABSTRACT

A control system for a cargo handling system is disclosed. The control system may be configured to advance larger containers at a slower speed than smaller containers. For instance, all containers may be initially advanced by the same first velocity control signal. At the expiration of a certain time period, all containers may thereafter be advanced by a different velocity control signal (from the first velocity control signal) that should least substantially maintain the velocity of the container as it existed at the time of the expiration of the noted time period. The length of the time period (for advancing the container at the first velocity control signal) may be varied based upon the size of the containers such that larger containers are accelerated for a shorter time than smaller containers and which in turn should then advance larger containers at a lower velocity compared to smaller containers.

20 Claims, 7 Drawing Sheets

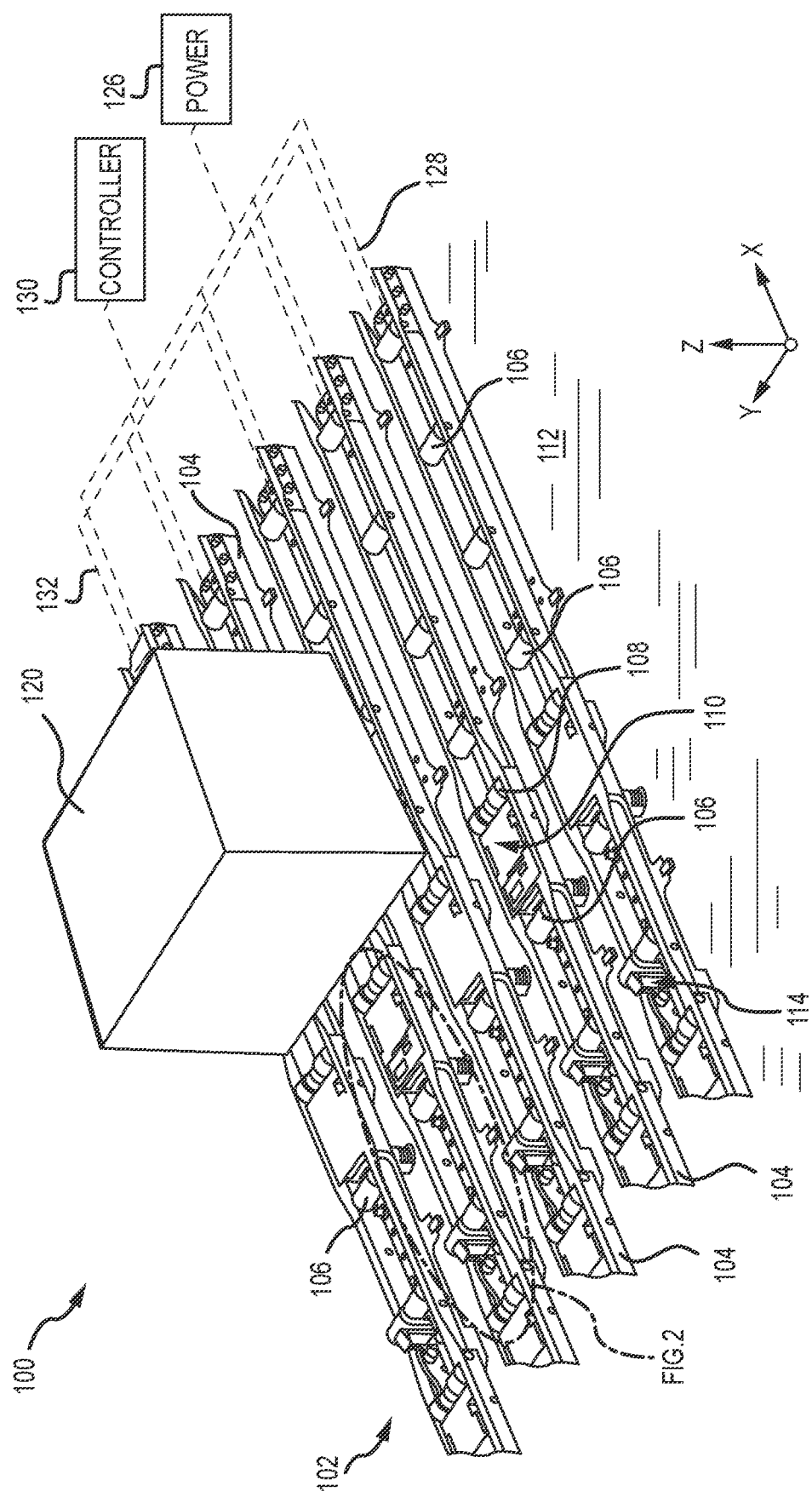

CARGO VELOCITY CONTROL FOR CARGO HANDLING SYSTEMS

FIELD

The present disclosure generally relates to the field of cargo handling systems and, more particularly, to controlling the speed of cargo in such cargo handling systems.

BACKGROUND

Cargo system integrators are continually improving the loading times for reduced turnaround time which has resulted in requests for faster system velocities. System velocities have been limited to reduce impact loading requirements on the aircraft structure when the cargo impacts an end-stop or latches in the parked position. Increasing the design point of the structure is not economically feasible.

SUMMARY

A control system for a cargo handling system is presented herein. Both the configuration of such a control system and the operation, operational characteristics, and use of such a control system are within the scope of this Summary.

The control system may be configured such that a given container is advanced by a first velocity control signal that is provided to each power drive unit (PDU) that is engaging the container. At the expiration of a certain time period, the container may thereafter be advanced by a different second velocity control signal (that is provided to each PDU that is engaging the container) that should at least substantially maintain the velocity of the container as it existed at the time of the expiration of the noted certain time period.

A number of feature refinements and additional features are applicable to the discussion of the preceding paragraph. These feature refinements and additional features may be used individually or in any combination. Both the first velocity control signal and the second velocity control signal may be used to advance the container along a cargo deck of a cargo compartment. The issuance of the second velocity control signal may immediately follow a termination of the issuance of the first velocity control signal.

The velocity of the container at the time of the switch from the first velocity control signal to the second velocity control signal may be less than the velocity of the container that would have been realized through a continued use of the first velocity control signal until the container reached a steady state velocity (e.g., until the container is no longer accelerating). The first velocity control signal may be configured so as to provide a maximum velocity of the container (e.g., a maximum velocity control signal). The first velocity control signal may be at a constant torque, at a maximum torque, or both in relation to a rotational drive source (e.g., a motor) for the PDU.

The number of PDUs that are engaging the container may be used by the control system. The amount of time that the container is advanced by the first velocity control signal may relate to the number of PDUs that are engaging the container. For instance, the length of time that the container is advanced by the first velocity control signal may decrease as the number of PDUs engaging the container increases (on a container-to-container basis). As such, the control system may be configured such that larger containers (that are engaged by more PDUs, relative to a smaller container) use the first velocity control signal for a shorter time compared to such a smaller container is being moved by the control system. Stated another way, the control system may be configured such that larger containers (that are engaged by more PDUs, relative to a smaller container) accelerate for a shorter time compared to such a smaller container. As such, the control system may be configured to advance larger containers (e.g., heavier containers) at a slower speed (via the corresponding second velocity control signal) than smaller containers. The length of time that the container is advanced by the first velocity control signal may decrease as the number of PDUs engaging the container increases on a proportional/linear basis, a piecewise linear basis, an exponential basis, via a table, or the like.

Various aspects of the present disclosure are also addressed by the following paragraphs and in the noted combinations:

1. A method of operating a cargo handling system, comprising:

issuing a first velocity control signal from a control system to each power drive unit that is currently engaging a container within a cargo compartment, wherein said issuing a first velocity control signal is executed for a first time period and after which time said container is moving at a first velocity; and issuing a second velocity control signal from said control system to each said power drive unit that is currently engaging said container, wherein said issuing a second velocity control signal is executed by said control system upon expiration of said first time period and continues to advance said container at least substantially at said first velocity.

2. The method of paragraph 1, further comprising:

advancing said container along a cargo deck of an aircraft and within said cargo compartment using said first velocity control signal, followed by using said second velocity control signal.

3. The method of any of paragraphs 1-2, wherein said first velocity is less than a velocity of said container that would be realized through execution of said issuing a first velocity control signal for a second time period that is greater than said first time period.

4. The method of any of paragraphs 1-3, wherein said first velocity control signal is one that will provide a maximum velocity of said container using each said power drive unit that is currently engaging said container.

5. The method of any of paragraphs 1-4, wherein said first velocity control signal provides a constant torque.

6. The method of any of paragraphs 1-5, wherein said first velocity control signal provides a maximum torque.

7. The method of any of paragraphs 1-6, further comprising:

receiving an input at said control system regarding a number of each said power drive unit that is engaging said container prior to said issuing a first velocity control signal.

8. The method of paragraph 7, wherein said input is received when said container is in a stationary position.

9. The method of any of paragraphs 7-8, wherein said first time period relates to said number of said power drive units for said input.

10. The method of paragraph 9, wherein a length of said first time period decreases as said number of said power drive units for said input increases.

11. The method of any of paragraphs 1-10, wherein said issuing a first velocity control signal and said issuing a second velocity control signal are executed each time a movement of said container is initiated.

12. A cargo handling system, comprising:
a cargo deck;
a plurality of power drive units associated with said cargo deck; and
a control system in communication with each of said plurality of power drive units, said control system comprising:
a processing system comprising at least one processor; and
memory storing instructions for execution by said processing system, said instructions comprising instructions to:
issue a first velocity control signal from said control system to each said power drive unit that is currently engaging a container on said cargo deck, wherein said first velocity control signal is provided for a first time period after which time said container should be moving at a first velocity; and
issue a second velocity control signal from said control system to each said power drive unit that is currently engaging said container, wherein said second velocity control signal is issued upon expiration of said first time period and continues to advance the container at least substantially at said first velocity.
13. The cargo handling system of paragraph 12, wherein said first velocity is less than a velocity of said container that would be realized by using said first velocity control signal for a second time period that is greater than said first time period.
14. The cargo handling system of any of paragraphs 12-13, wherein said first velocity control signal is one that will provide a maximum velocity of said container using each said power drive unit that is currently engaging said container.
15. The cargo handling system of any of paragraphs 12-14, wherein said first velocity control signal provides a constant torque.
16. The cargo handling system of any of paragraphs 12-15, wherein said first velocity control signal provides a maximum torque.
17. The cargo handling system of any of paragraphs 12-16, wherein said memory is further configured to receive an input of a number of power drive units in said plurality of drive units that are engaging said container prior to issuing said first velocity control signal.
18. The cargo handling system of paragraph 17, wherein said input is received when said container is in a stationary position.
19. The cargo handling system of any of paragraphs 17-18, wherein said first time period relates to said number of power drive units in said plurality of drive units for said input.
20. The cargo handling system of paragraph 19, wherein a length of said first time period decreases as said number of power drive units in said plurality of drive units for said input increases.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

FIG. 1B illustrates a portion of a cargo handling system, in accordance with various embodiments;

DETAILED DESCRIPTION

Figure 1A:
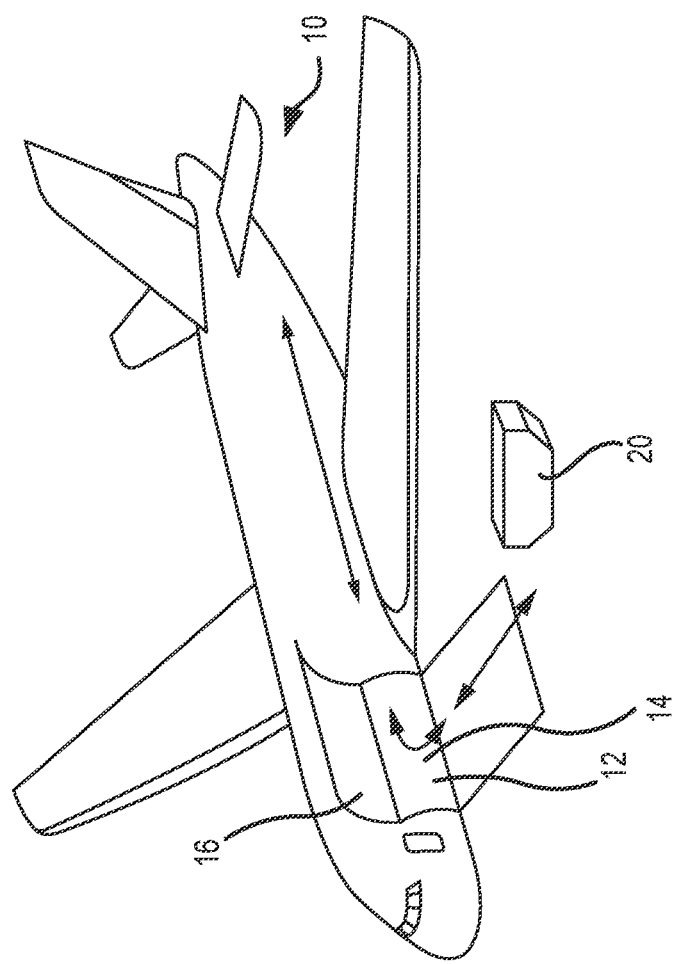
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
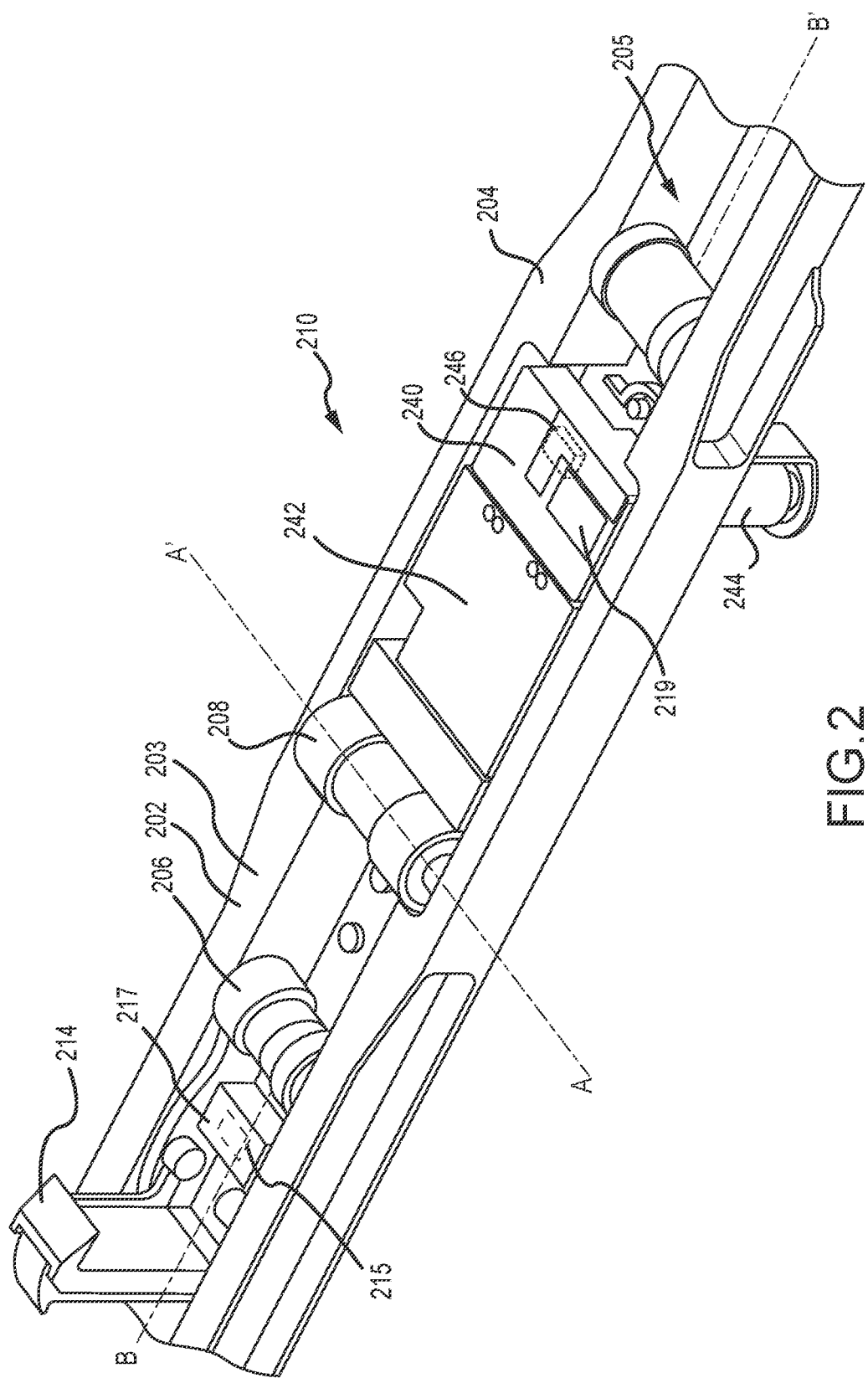
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
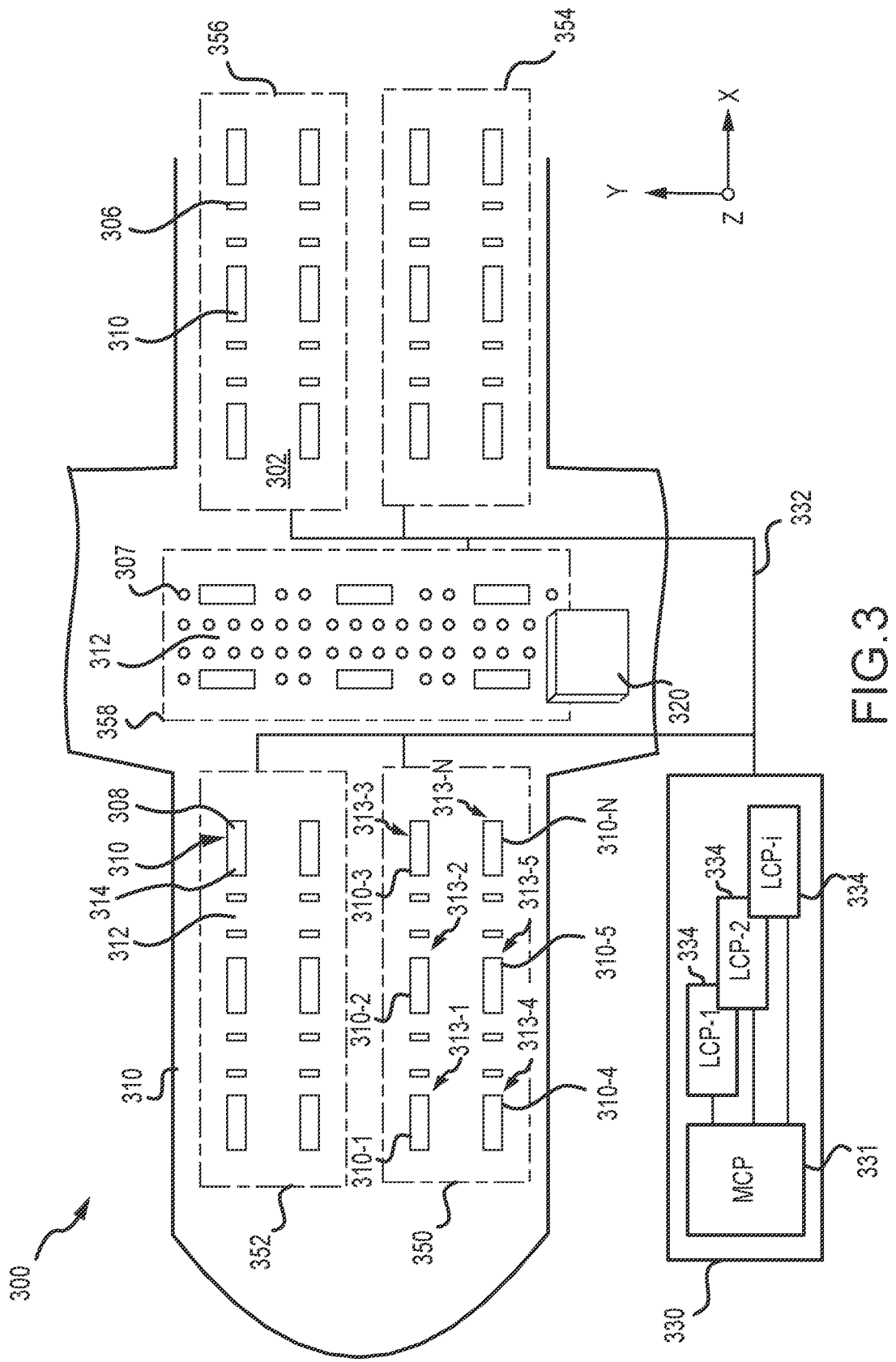
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-1 may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4:
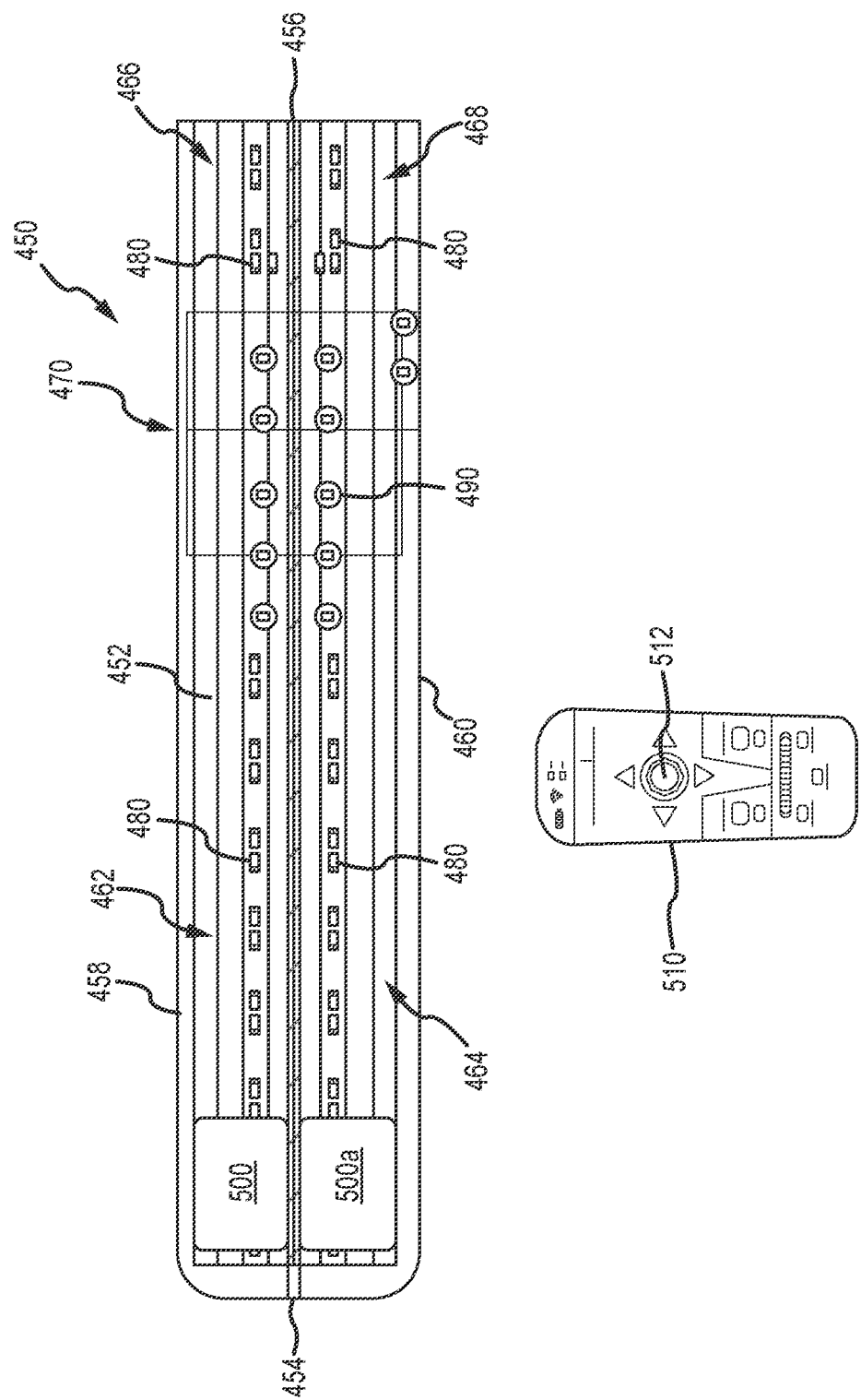
FIG. 4 illustrates a mobile cargo controller in relation to a cargo compartment, in accordance with various embodiments.

FIG. 4 illustrates a mobile cargo controller 510 in relation to a representative cargo compartment 450 (e.g., for an aircraft). The mobile cargo controller 510 includes a cargo motion controller 512 (e.g., a joystick). Moving the cargo motion controller 512 will produce a corresponding movement of a corresponding container 500 (e.g., a ULD), for instance container 500*a*, along a deck 452 of the cargo compartment 450.

The cargo compartment 450 of FIG. 4 is defined by a forward end 454, an aft or rear end 456 that is spaced from the forward end 454 along a length (or longitudinal) dimension of the cargo compartment 450, a right side 458, and a left side 460 that is spaced from the right side 458 along a width (or lateral) dimension of the cargo compartment 450. The cargo compartment 450 may be characterized as including a plurality of separate cargo zones, including a forward-right cargo zone 462, a forward-left cargo zone 464, an aft-right cargo zone 466, and an aft-left cargo zone 468. The cargo compartment 450 may also be characterized as including a doorway zone 470 (e.g., for loading cargo into and unloading cargo from the cargo compartment 450) that is disposed between a forward cargo compartment (collectively cargo zones 462, 464) and an aft cargo compartment (collectively cargo zones 466, 468).

The deck 452 of the cargo compartment 450 may include a plurality of PDUs 480 (e.g., for advancing cargo along an at least generally axial/linear path relative to the cargo deck 452), as well as a plurality of freighter common turntables or FCTs 490 that are a specific type of PDU (having the ability to axially advance associated cargo, as well as to rotate associated cargo). The FCTs 490 are disposed in the doorway zone 470 of the cargo compartment 450.

Figure 5:
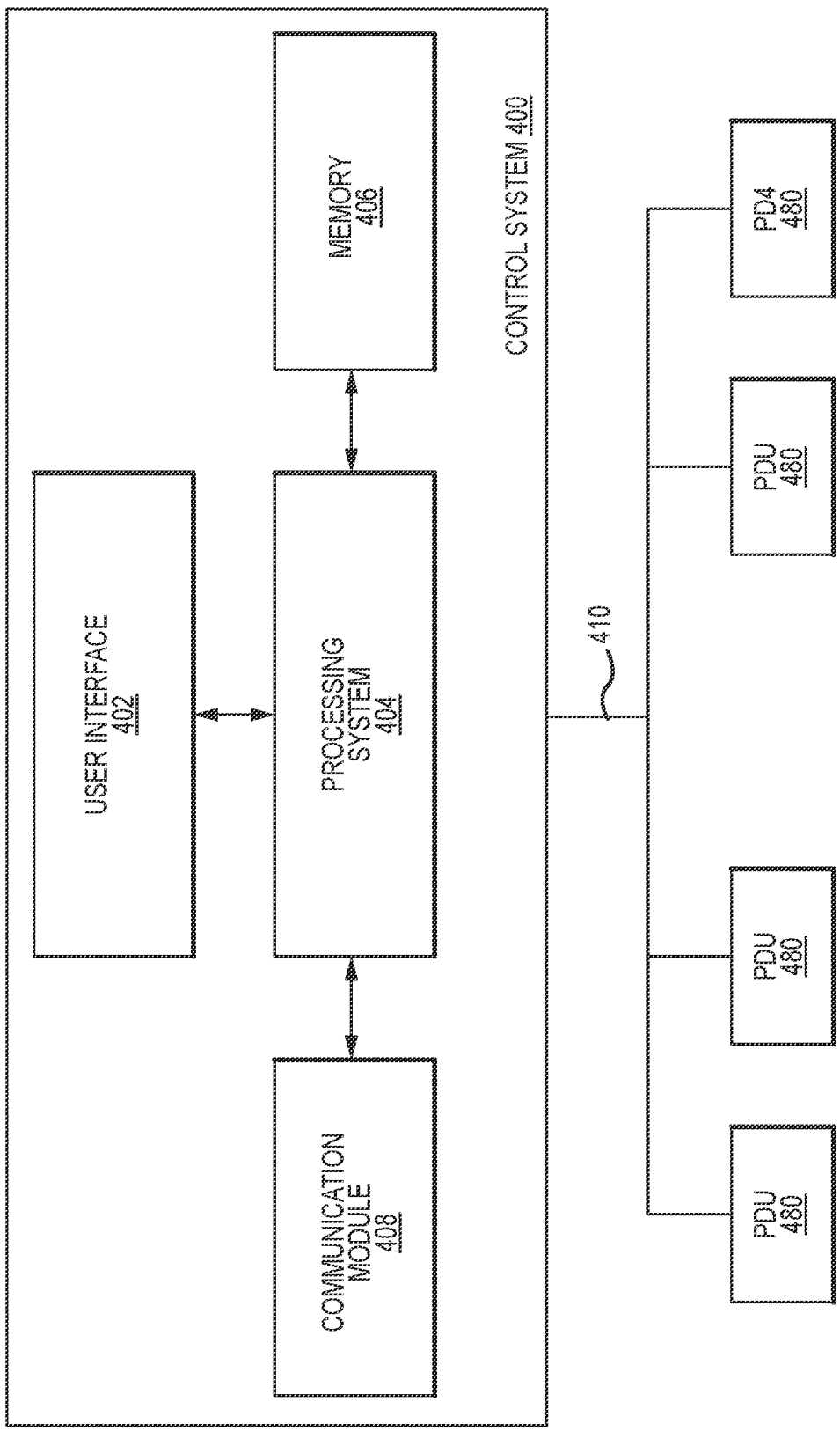
FIG. 5 is a functional schematic of a control system with cargo velocity control for a cargo handling system, in accordance with various embodiments.

A control system for a cargo handling system is illustrated in FIG. 5 is identified by reference numeral 400. The control system 400 may be incorporated in any appropriate manner, including without limitation on a distributed basis. For instance, all or a portion of the control system 400 may be incorporated by one or more of a master control panel for the cargo compartment 450, a local control panel for the cargo compartment 450, or the mobile cargo controller 510.

The control system 400 includes a user interface 402 of any appropriate type (e.g., a monitor, a keyboard, a mouse, a touchscreen), a processing system 404 (e.g., a central processing unit; one or more processors or microprocessors of any appropriate type and utilizing any appropriate processing architecture and including a distributed processing architecture), memory 406, and a communication module 408 of any appropriate configuration and/or modality (e.g., to accommodate communications between the control system 400 and at least one of the mobile cargo controller 510 and relevant PDUs 480 in the cargo compartment 450). Any appropriate communication link 410 may be provided between the control system 400 and each of the various PDUs 480 and the cargo compartment 450 (e.g., wired or wireless).

Figure 6:
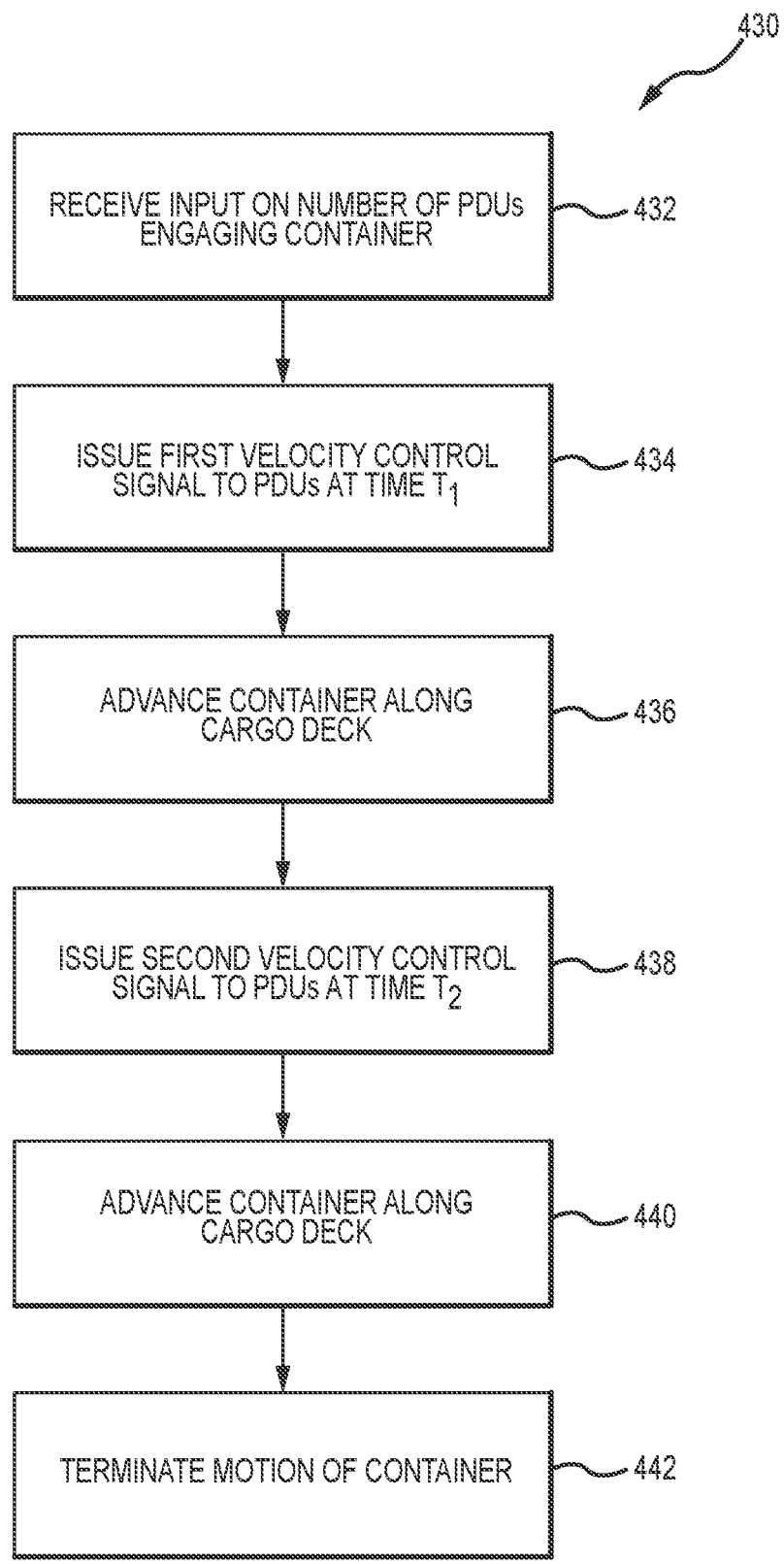
FIG. 6 is a cargo velocity control protocol that may be used by the control system of FIG. 5, in accordance with various embodiments.

A cargo velocity control protocol is illustrated in FIG. 6, is identified by reference numeral 430, may be stored in the memory 406 of the control system 400, and may be executed by/through the processing system 404. The control system 400 may be configured to execute the cargo velocity control protocol 430 each time a movement of a container 500 is initiated (e.g., for each activation of the joystick 512 of the mobile cargo controller 510).

The cargo velocity control protocol 430 of FIG. 6 includes receiving an input on a number of PDUs 480 that will engage a container 500 in the cargo compartment 450 at any one time and that will be used to move the container 500 (e.g., container 500*a* in the forward-left cargo zone 464 in FIG. 4, and which hereafter will be used in the discussion of the cargo velocity control protocol 430; via operation of the mobile cargo controller 510 in FIG. 4). The initial input (432) for purposes of the cargo velocity control protocol 430 may be when the relevant container 500*a* is in a stationary position on the cargo deck 452. The number of PDUs 480 that are engaging the container 500*a* at any one time may be determined in any appropriate manner and may be provided to the control system 400 in any appropriate manner as well.

The control system 400 issues a first velocity control signal at time $T_1$ to PDUs 480 in the cargo compartment 450 (434) that are/will be used to advance the container 500*a* (436), and thereby including each of the PDUs 480 that is currently engaging the container 500*a*. The first velocity control signal (434) is provided for a first time period—extending from time $T_1$ to a time $T_2$ (438). At time $T_2$ the control system 400 issues a second velocity control signal to PDUs 480 in the cargo compartment 450 (438) that are/will be used to advance the container 500*a* (440), and thereby including each of the PDUs 480 that is currently engaging the container 500*a*. The second velocity control signal (438) may be one that at last substantially maintains the velocity of the container 500*a* as it existed at time $T_2$ (the time when the control signal to the relevant PDUs 480 is switched from the first velocity control signal to the second velocity control signal) and may be used to advance the container 500*a* until reaching the desired destination at which time motion of the container 500*a* terminates (442). The velocity of the container 500*a* at time $T_2$ should be less than the velocity that the container 500*a* would reach if allowed to reach a steady state velocity based upon the first velocity control signal (434). Step 438 may be viewed as reducing the acceleration time of the container 500*a*.

The first velocity control signal (434) for the cargo velocity control protocol 430 may be one that would provide a maximum velocity of the container 500*a* using each PDU 480 that is at least currently engaging the container 500*a*, and furthermore may provide for a constant torque and/or a maximum torque in relation to each such PDU 480. The length of the time period between $T_1$ and $T_2$ during which each of relevant PDUs 480 are each driven by the first velocity control signal (438), or stated another way the time period at which each of relevant PDUs 480 are each driven by the first velocity control signal (438), may be based upon the number of PDUs 480 that engage the container 500*a* at any one time (432). The time period between time $T_1$ (434) and time $T_2$ (438) may be in proportion the number of PDUs 480 that engage the container 500*a* at any one time. The time period between time $T_1$ (434) and time $T_2$ (438) may decrease as the number of PDUs 480 that engage the container 500*a* increases, although the cargo velocity control protocol 430 may be configured to provide at least some minimum velocity for all containers 500 (e.g., a "reduction" in the time period between time between time $T_1$ (434) and time $T_2$ (438) may be "capped" at a certain number of PDUs 480).

Consider the case where a first container 500 is of a first size and is engaged by a first number of PDUs 480, where a second container 500 is of a second size and is engaged by a second number of PDUs 480, and where the second number of PDUs 480 is larger than the first number of PDUs 480. In this case, the second container 500 may be assumed to be larger/heavier than the first container 500 for purposes of the cargo velocity control protocol 430. The cargo velocity control protocol 430 may be configured such that the difference between time $T_1$ and time $T_2$ for the second container 500 (the larger container 500) will be smaller than the difference between time $T_1$ and time $T_2$ for the first container 500 (the smaller container 500). This in turn will reduce the acceleration time for the larger second container 500 compared to the smaller first container 500, and thereby the velocity for the larger second container 500 (via the second velocity control signal (438)) compared to the smaller first container 500 (via the second velocity control signal (438)). As such, the cargo velocity control protocol 430 may be configured such that larger containers 500 will be moved at a slower speed along the cargo deck 452 compared to smaller containers 500, which may be beneficial in one or more respects (e.g., to reduce impact loading requirements for larger (and presumably heavier) containers 500.

In various embodiments, memory 406 is configured to store information used by the control system 400, including to execute the cargo velocity control protocol 430. In various embodiments, memory 406 comprises a computer-readable storage medium, which, in various embodiments, includes a non-transitory storage medium. In various embodiments, the term "non-transitory" indicates that the memory 406 is not embodied in a carrier wave or a propagated signal. In various embodiments, the non-transitory storage medium stores data that, over time, changes (e.g., such as in a random access memory (RAM) or a cache memory). In various embodiments, memory 406 comprises a temporary memory. In various embodiments, memory 406 comprises a volatile memory. In various embodiments, the volatile memory includes one or more of RAM, dynamic RAM (DRAM), static RAM (SRAM), and/or other forms of volatile memories. In various embodiments, memory 406 is configured to store computer program instructions for execution by processing system 404. In various embodiments, applications and/or software running on control system 400 utilize(s) memory 406 in order to temporarily store information used during program execution. In various embodiments, memory 406 includes one or more computer-readable storage media. In various embodiments, memory 406 is configured to store larger amounts of information than volatile memory. In various embodiments, memory 406 is configured for longer-term storage of information. In various embodiments, memory 406 includes non-volatile storage elements, such as, for example, electrically programmable memories (EPROM), electrically erasable and programmable (EEPROM) memories, flash memories, floppy discs, magnetic hard discs, optical discs, and/or other forms of memories.

In various embodiments, the processing system 404 of the control system 400 is configured to implement functionality and/or process instructions, such as the cargo velocity control protocol 430. In various embodiments, the processing system 404 is configured to process computer instructions stored in memory 406. In various embodiments, processing system 404 includes one or more of a microprocessor, a controller, a digital signal processor (DSP), an application specific integrated circuit (ASIC), a field-programmable gate array (FPGA), or other equivalent discrete or integrated logic circuitry.

System program instructions and/or processor instructions may be loaded onto memory 406 of the control system 400. The system program instructions and/or processor instructions may, in response to execution by operator, cause processing system 404 to perform various operations. In particular, and as described in further detail above, the instructions may allow processing system 404 to execute the cargo velocity control protocol 320 of FIG. 6. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of operating a cargo handling system, comprising:
   issuing a first velocity control signal from a control system to each power drive unit that is currently engaging a container within a cargo compartment, wherein said issuing the first velocity control signal is executed for a first time period and after which time said container is moving at a first velocity; and
   issuing a second velocity control signal from said control system to each said power drive unit that is currently engaging said container, wherein said issuing the second velocity control signal is executed by said control system upon expiration of said first time period and continues to advance said container at least substantially at said first velocity.

2. The method of claim 1, further comprising:
   advancing said container along a cargo deck of an aircraft and within said cargo compartment using said first velocity control signal, followed by using said second velocity control signal.

3. The method of claim 1, wherein said first velocity is less than a velocity of said container that would be realized through execution of said issuing the first velocity control signal for a second time period that is greater than said first time period.

4. The method of claim 1, wherein said first velocity control signal is one that will provide a maximum velocity of said container using each said power drive unit that is currently engaging said container.

5. The method of claim 1, wherein said first velocity control signal provides a constant torque.

6. The method of claim 1, wherein said first velocity control signal provides a maximum torque.

7. The method of claim 1, further comprising:
   receiving an input at said control system regarding a number of each said power drive unit that is engaging said container prior to said issuing the first velocity control signal.

8. The method of claim 7, wherein said input is received when said container is in a stationary position.

9. The method of claim 7, wherein said first time period relates to said number of said power drive units for said input.

10. The method of claim 9, wherein a length of said first time period decreases as said number of said power drive units for said input increases.

11. The method of claim 1, wherein said issuing a first velocity control signal and said issuing a second velocity control signal are executed each time a movement of said container is initiated.

12. A cargo handling system, comprising:
    a cargo deck;
    a plurality of power drive units associated with said cargo deck; and
    a control system in communication with each of said plurality of power drive units, said control system comprising:
      a processing system comprising at least one processor; and
      memory storing instructions for execution by said processing system, said instructions comprising instructions to:
      issue a first velocity control signal from said control system to each said power drive unit that is currently engaging a container on said cargo deck, wherein said first velocity control signal is provided for a first time period after which time said container should be moving at a first velocity; and
      issue a second velocity control signal from said control system to each said power drive unit that is currently engaging said container, wherein said second velocity control signal is issued upon expiration of said first time period and continues to advance the container at least substantially at said first velocity.

13. The cargo handling system of claim 12, wherein said first velocity is less than a velocity of said container that would be realized by using said first velocity control signal for a second time period that is greater than said first time period.

14. The cargo handling system of claim 12, wherein said first velocity control signal is one that will provide a maximum velocity of said container using each said power drive unit that is currently engaging said container.

15. The cargo handling system of claim 12, wherein said first velocity control signal provides a constant torque.

16. The cargo handling system of claim 12, wherein said first velocity control signal provides a maximum torque.

17. The cargo handling system of claim 12, wherein said memory is further configured to receive an input of a number of power drive units in said plurality of drive units that are engaging said container prior to issuing said first velocity control signal.

18. The cargo handling system of claim 17, wherein said input is received when said container is in a stationary position.

19. The cargo handling system of claim 17, wherein said first time period relates to said number of power drive units in said plurality of drive units for said input.

20. The cargo handling system of claim 19, wherein a length of said first time period decreases as said number of power drive units in said plurality of drive units for said input increases.

* * * * *